(12) United States Patent
Toni et al.

(10) Patent No.: US 8,636,250 B2
(45) Date of Patent: Jan. 28, 2014

(54) EXTERNAL CARGO HOOK SYSTEM FOR ROTARY-WING AIRCRAFT

(75) Inventors: Darryl M. Toni, Madison, CT (US);
Mary McCarthy, Milford, CT (US);
Bruce H. Barr, Huntington, CT (US);
Anthony Z. Stobiecki, Shelton, CT (US); Thomas Swift, Monroe, CT (US);
Thomas Dziekonski, Milford, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 115 days.

(21) Appl. No.: 13/258,545

(22) PCT Filed: Mar. 8, 2010

(86) PCT No.: PCT/US2010/026465
§ 371 (c)(1),
(2), (4) Date: Sep. 22, 2011

(87) PCT Pub. No.: WO2010/138229
PCT Pub. Date: Dec. 2, 2010

(65) Prior Publication Data
US 2012/0018569 A1   Jan. 26, 2012

Related U.S. Application Data

(60) Provisional application No. 61/177,347, filed on May 12, 2009.

(51) Int. Cl.
*B64D 1/00* (2006.01)
*B64D 1/22* (2006.01)
*B64D 9/00* (2006.01)
*B64C 1/22* (2006.01)

(52) U.S. Cl.
USPC .............. 244/118.2; 244/118.1; 244/137.4

(58) Field of Classification Search
USPC ....... 244/137.4, 137.1, 118.2, 118.1, 3, 1 TD, 244/127, 125, 26, 17.11; 294/82.24, 82.26; 258/1.2–1.8; 212/180
See application file for complete search history.

(56) References Cited

U.S. PATENT DOCUMENTS

| | | | |
|---|---|---|---|
| 1,332,345 A | 3/1920 | Kenyon | |
| 2,468,009 A * | 4/1949 | Bigley, Jr et al. | 244/137.4 |
| 3,044,818 A * | 7/1962 | Tobey | 244/137.4 |
| 3,176,939 A * | 4/1965 | Mard et al. | 244/137.4 |
| 3,601,342 A * | 8/1971 | Piasecki | 244/137.4 |
| 3,823,901 A * | 7/1974 | Holmes et al. | 244/118.1 |
| 3,957,233 A | 5/1976 | Adams | |
| 3,957,234 A | 5/1976 | Mulvey et al. | |
| 4,059,247 A | 11/1977 | Prewitt | |

(Continued)

OTHER PUBLICATIONS

PCT Search Report and Written Opinion dated Dec. 23, 2010.

(Continued)

*Primary Examiner* — Tien Dinh
*Assistant Examiner* — Richard R Green
(74) *Attorney, Agent, or Firm* — Carlson, Gaskey & Olds, P.C.

(57) ABSTRACT

An external hook system for a rotary-wing aircraft includes a lower frame interface which accommodates longitudinal and lateral loads and an upper frame interface. A tension member is mountable between the lower frame interface and the upper frame interface to transfer tension loads between the lower frame interface and the upper frame interface.

16 Claims, 10 Drawing Sheets

(56) References Cited

U.S. PATENT DOCUMENTS

| | | |
|---|---|---|
| 4,138,078 A | 2/1979 | Hester et al. |
| 4,379,534 A | 4/1983 | Miller et al. |
| 4,441,750 A | 4/1984 | Reber |
| 4,598,882 A | 7/1986 | Opdahl |
| 4,609,167 A | 9/1986 | Dean et al. |
| 4,609,168 A | 9/1986 | Dean et al. |
| 4,691,878 A | 9/1987 | Vaughan et al. |
| 4,780,838 A | 10/1988 | Adelson |
| 4,979,698 A | 12/1990 | Lederman |
| 4,993,665 A | 2/1991 | Sparling |
| 4,998,763 A | 3/1991 | Henke |
| 5,074,608 A | 12/1991 | Gabriel |
| 5,085,315 A | 2/1992 | Sambell |
| 5,158,247 A | 10/1992 | Ferrier |
| 5,264,666 A | 11/1993 | English et al. |
| 5,417,304 A | 5/1995 | Kurtgis |
| 5,465,925 A | 11/1995 | Connolly et al. |
| 5,499,785 A | 3/1996 | Roberts et al. |
| 5,788,186 A | 8/1998 | White |
| 5,850,991 A | 12/1998 | Hainsworth et al. |
| 5,887,924 A | 3/1999 | Green et al. |
| RE36,333 E | 10/1999 | Kovaletz |
| 6,102,469 A | 8/2000 | Shambeau et al. |
| 6,113,031 A | 9/2000 | Williams et al. |
| 6,488,236 B2 * | 12/2002 | Landry ............ 244/137.1 |
| 6,578,793 B2 | 6/2003 | Byrnes et al. |
| 6,708,926 B2 | 3/2004 | Bonisch |
| 6,942,177 B1 | 9/2005 | Marcaccio |

OTHER PUBLICATIONS

Notification concerning transmittal of International Preliminary Report on Patentability, mailed Nov. 24, 2001, PCT/US2010/026465.

\* cited by examiner

FIG. 7

EXTERNAL CARGO HOOK SYSTEM FOR ROTARY-WING AIRCRAFT

REFERENCE TO RELATED APPLICATIONS

The present disclosure claims the benefit of U.S. Provisional Patent Application No. 61/177,347, filed May 12, 2009.

STATEMENT REGARDING FEDERALLY SPONSORED RESEARCH OR DEVELOPMENT

This disclosure was made with Government support under N00019-03-G-0003, D.O. 0025 awarded by The United States Navy. The Government has certain rights in this invention.

BACKGROUND

The present disclosure relates to a vertical takeoff and landing (VTOL) rotary-wing aircraft, and more particularly to an external cargo hook system therefor.

Vertical takeoff and landing (VTOL) rotary-wing aircraft are unique in their ability to carry loads externally. External load operations provide a rapid procedure to load, transport, and unload cargo. Frequently, a sling or set of slings are used to attach the slung load to the aircraft for transportation. External load operations are particularly advantageous for situations where ground topography is not conducive to aircraft landing, or where rapid cargo loading and unloading is required.

Conventional external cargo hook systems locate a cargo hook within a lower belly portion of an aircraft airframe. The load on the conventional belly mounted cargo hook transfers the load on the hook system around the open cargo space of the aircraft cabin, and then into an upper portion of the aircraft airframe. Although effective, this indirect load path may parallelogram the frame in response to some flight loads and place undesirable stresses on the airframe. Other conventional cargo hook systems locate a frame structure within an upper portion of the aircraft cabin. Although this provides a more direct load path through the airframe, the pendant may swing within the cabin such that a relatively large opening in the airframe belly is required to accommodate the motion.

SUMMARY

An external hook system for a rotary-wing aircraft according to an exemplary aspect of the present disclosure includes a lower frame interface which accommodates longitudinal and lateral loads and an upper frame interface. A tension member mountable between the lower frame interface and the upper frame interface, the tension member operable to transfer tension loads between the lower frame interface and the upper frame interface.

A rotary-wing aircraft according to an exemplary aspect of the present disclosure includes an airframe. A lower frame interface mounted to a lower portion of the airframe, the lower frame interface accommodates longitudinal and lateral loads. An upper frame interface mounted to an upper portion of the airframe adjacent a main rotor system. A tension member mountable between the lower frame interface and the upper frame interface through an aircraft cabin defined by the airframe, the tension member operable to transfer tension loads between the lower frame interface and the upper frame interface.

A method of supporting an external load from a rotary-wing aircraft according to an exemplary aspect of the present disclosure includes accommodating longitudinal and lateral loads of the external load at a lower frame interface and accommodating a tension load of the external load between the lower frame interface and an upper frame interface, the upper frame interface adjacent a main rotor system of the rotary wing aircraft.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1A:
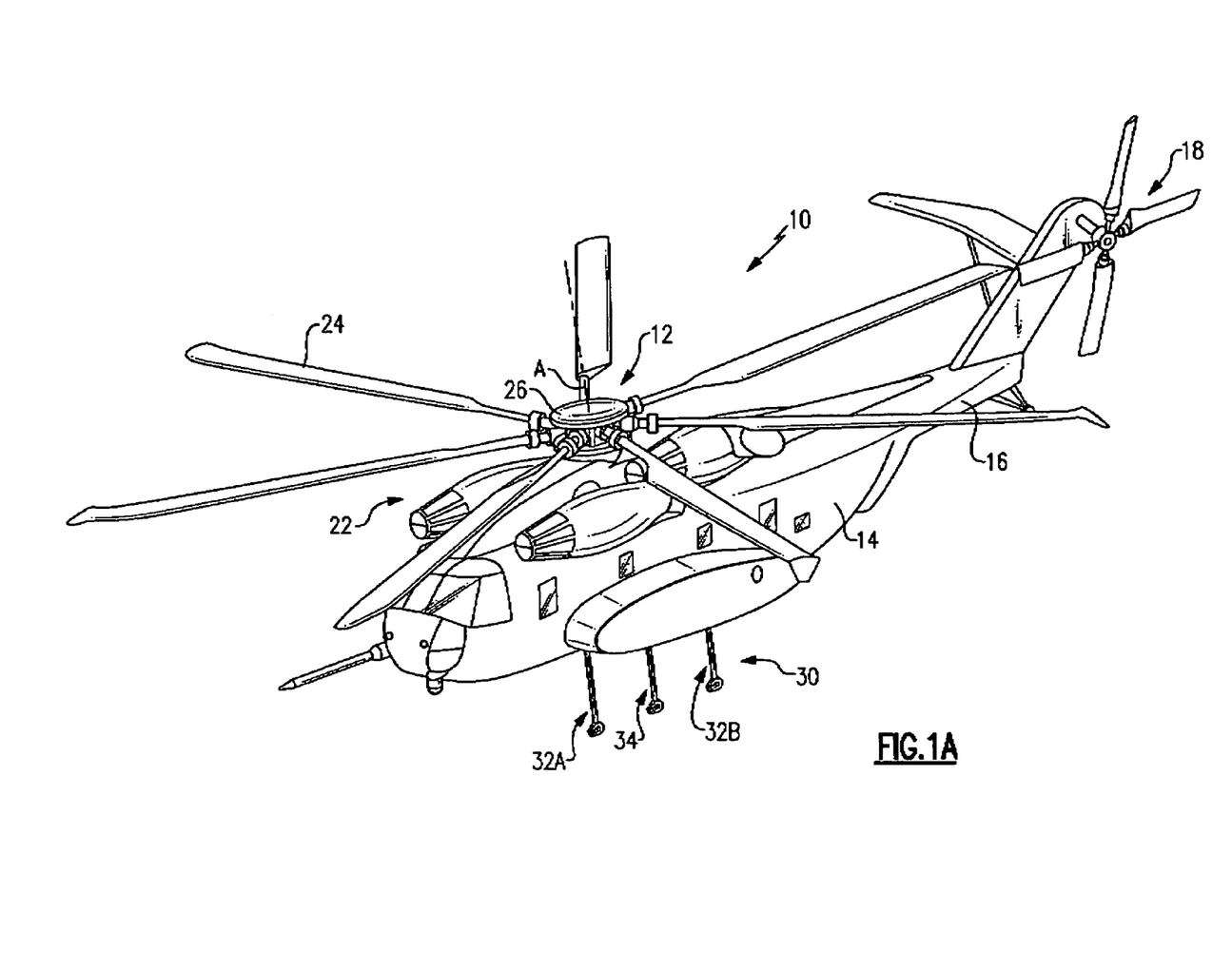
FIG. 1A is a general schematic view of an exemplarily rotary-wing aircraft for use with a non-limiting embodiment of the present disclosure.
Figure 1B:
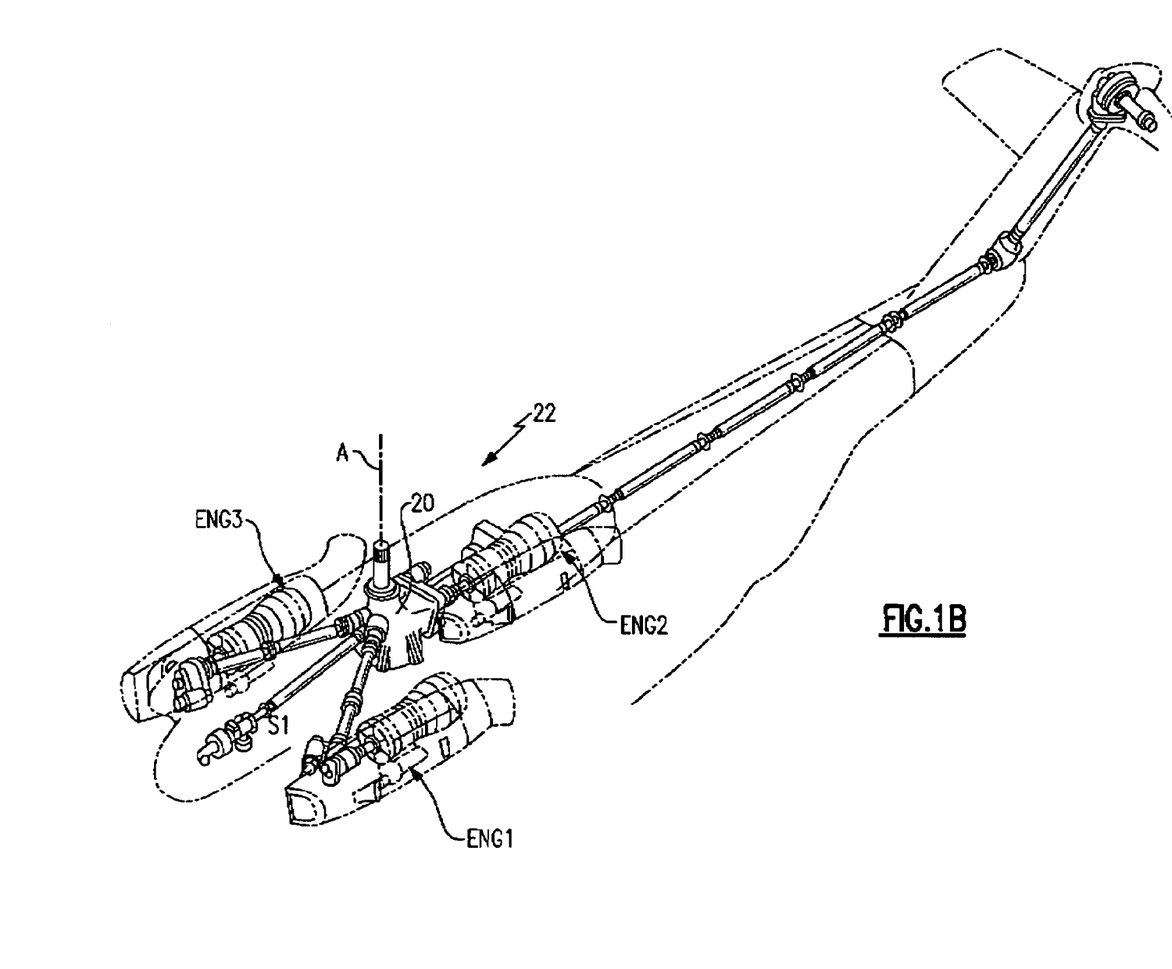
FIG. 1B is a partial phantom view of the exemplarily rotary-wing aircraft powerplant system.

FIG. 1A schematically illustrates a rotary-wing aircraft 10 having a main rotor system 12. The aircraft 10 includes an airframe 14 having an extending tail 16 which mounts an anti-torque system 18. The main rotor assembly 12 is driven about an axis of rotation A through a main rotor gearbox (MGB) 20 (FIG. 1B) by a multi-engine powerplant system 22 here having three engine packages ENG1, ENG2, ENG3. The multi-engine powerplant system 22 generates the power available for flight operations and couples such power to the main rotor assembly 12 and the anti-torque system 18 through the MGB 20. The main rotor system 12 includes a multiple of rotor blades 24 mounted to a rotor hub 26. Although a particular helicopter configuration is illustrated and described in the disclosed embodiment, other configurations and/or machines, such as high speed compound rotary-wing aircraft with supplemental translational thrust systems, dual contra-rotating, coaxial rotor system aircraft, turbo-props, tilt-rotors and tilt-wing aircraft, will also benefit from the present invention.

Figure 2A:
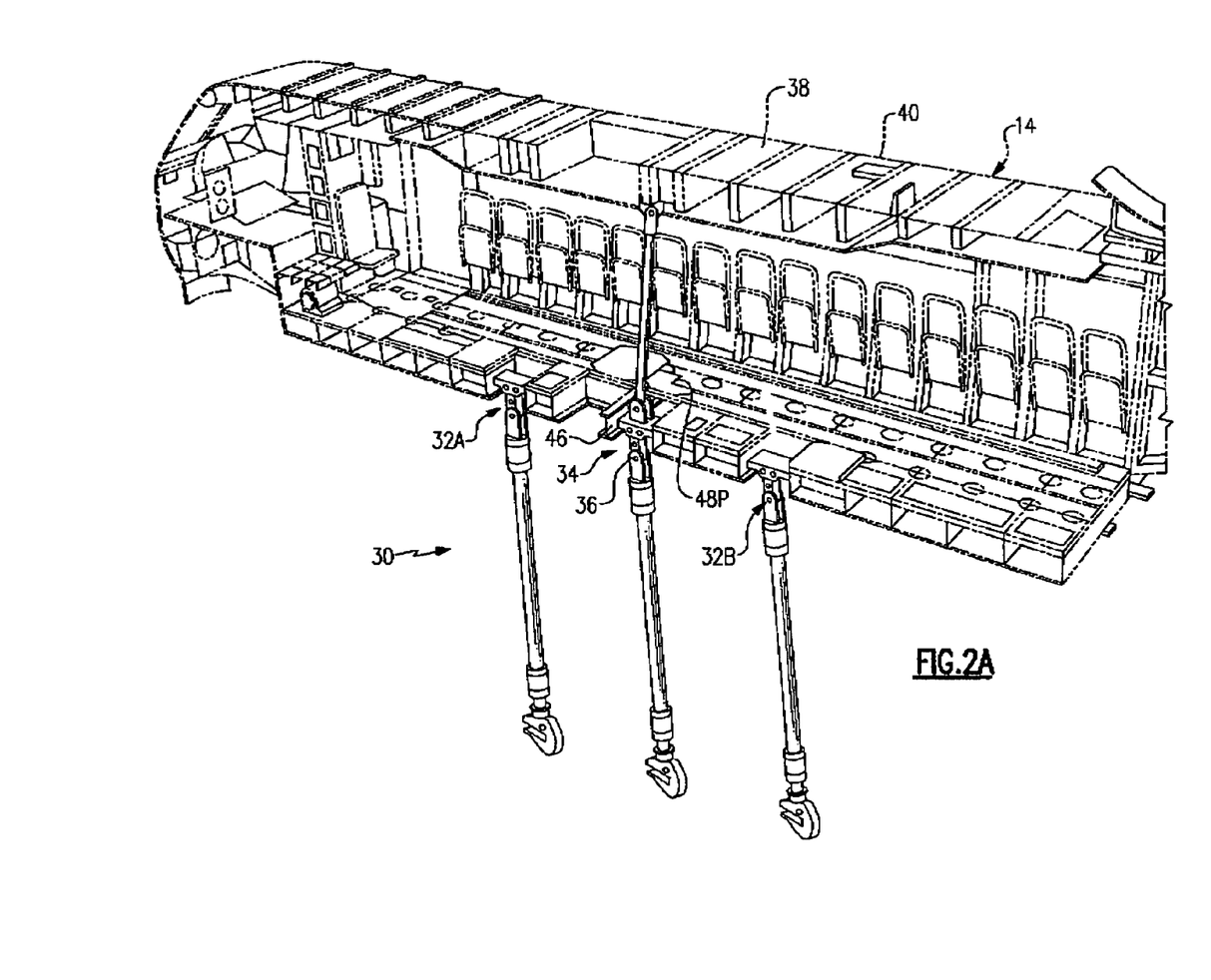
FIG. 2A is a longitudinal sectional view of the rotary-wing aircraft having an external cargo hook system.

Referring to FIG. 2A, an external cargo hook system 30 is mounted to the airframe 14. The external cargo hook system 30 in the disclosed non-limiting embodiment includes a forward hook system 32A, a center hook system 34 and an aft hook system 32B. The center hook system 34 may generally be of a higher capacity, on the order of 36,000 pounds in the disclosed non-limiting embodiment, while the forward hook system 32A and the aft hook system 32B may be of a lesser capacity. Although the center hook system 34 will be described in detail herein, it should be understood that any external cargo hook system will also benefit herefrom.

Figure 2B:
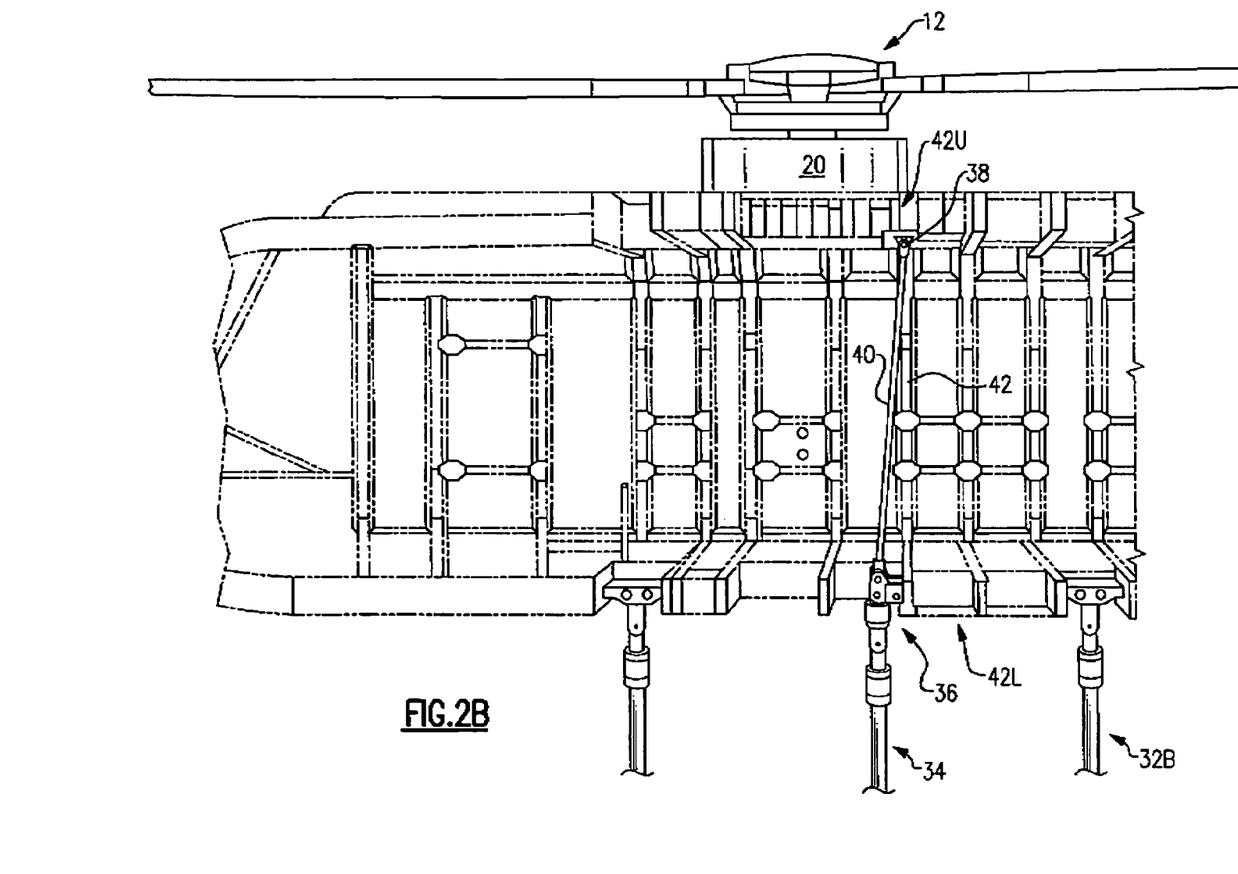
FIG. 2B is an expanded longitudinal sectional view of a center hook system of the external cargo hook system mounted to a frame of the rotary-wing aircraft airframe.
Figure 2C:
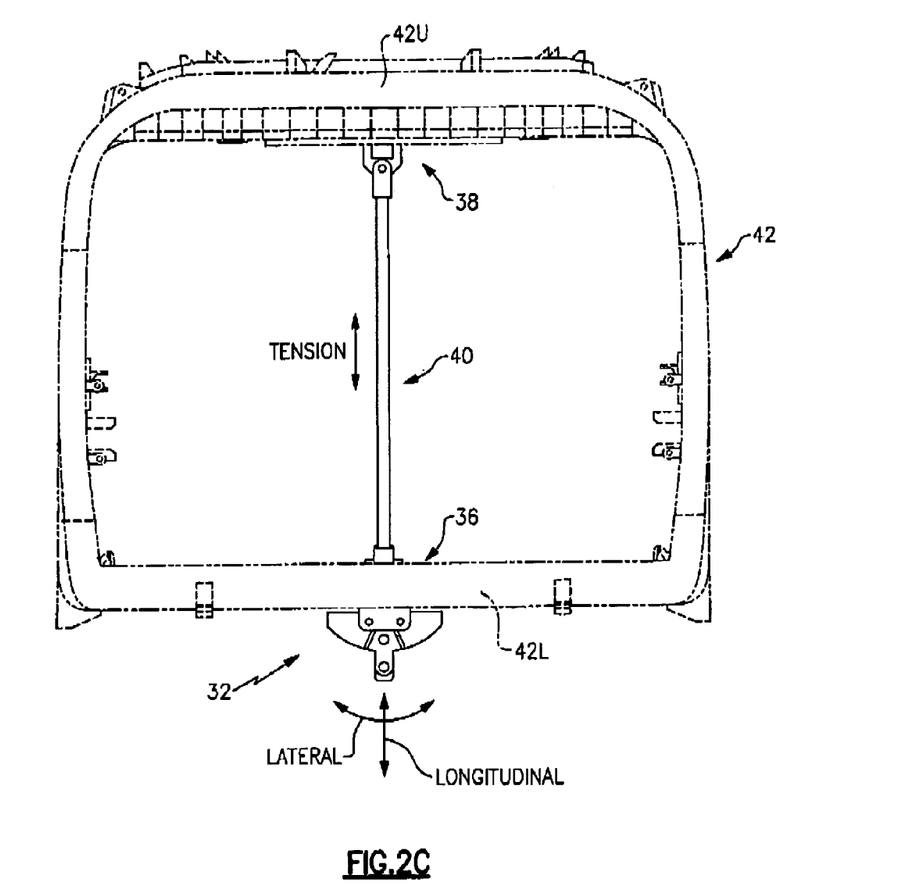
FIG. 2C is an expanded lateral view of the center hook system mounted to a frame of the rotary-wing aircraft airframe.

The center hook system 34 generally includes a lower frame interface 36, an upper frame interface 38 and a tension member 40 which is mounted therebetween (FIG. 2B). The lower frame interface 36 is mounted to a lower portion 42L of a frame 42 and the upper frame interface 38 is mounted to an upper portion 42U of the frame 42 (FIG. 2C). The frame 42 may be a common single generally rectilinear frame of the airframe 14 or may alternatively be two separate generally rectilinear frames of the airframe 14. That is, the lower frame interface 36 and the upper frame interface 38 may be mounted to the same frame or different frames.

The lower frame interface 36 is affixed to the frame 42 adjacent to a rear portion of an opening 46. The opening 46 provides for receipt of the lower frame interface 36 when in a stowed position essentially within an aircraft cabin floor 48 and may be selectively covered by a floor panel 48P. It should be understood that other mount configurations and arrangements may alternatively or additionally be utilized herewith.

Referring to FIG. 2B, the upper frame interface 38 in one non-limiting embodiment is mounted directly below the MGB 20. The upper portion 42U of the frame 42 to which the upper frame interface 38 is mounted also supports the MOB 20 such that the tension load on the upper frame interface 38 is more directly reacted by the MOB 20. That is, the tension loads from an external load are supported essentially directly from the main rotor system 12. The tension loads on the center hook system 34 are thereby reacted more efficiently by the main rotor system 12 as opposed to a conventional belly mounted cargo hook system in which the load is transferred from the hook system, around the open cargo space defined by the aircraft cabin, and then into the main rotor system 12.

Figure 3:
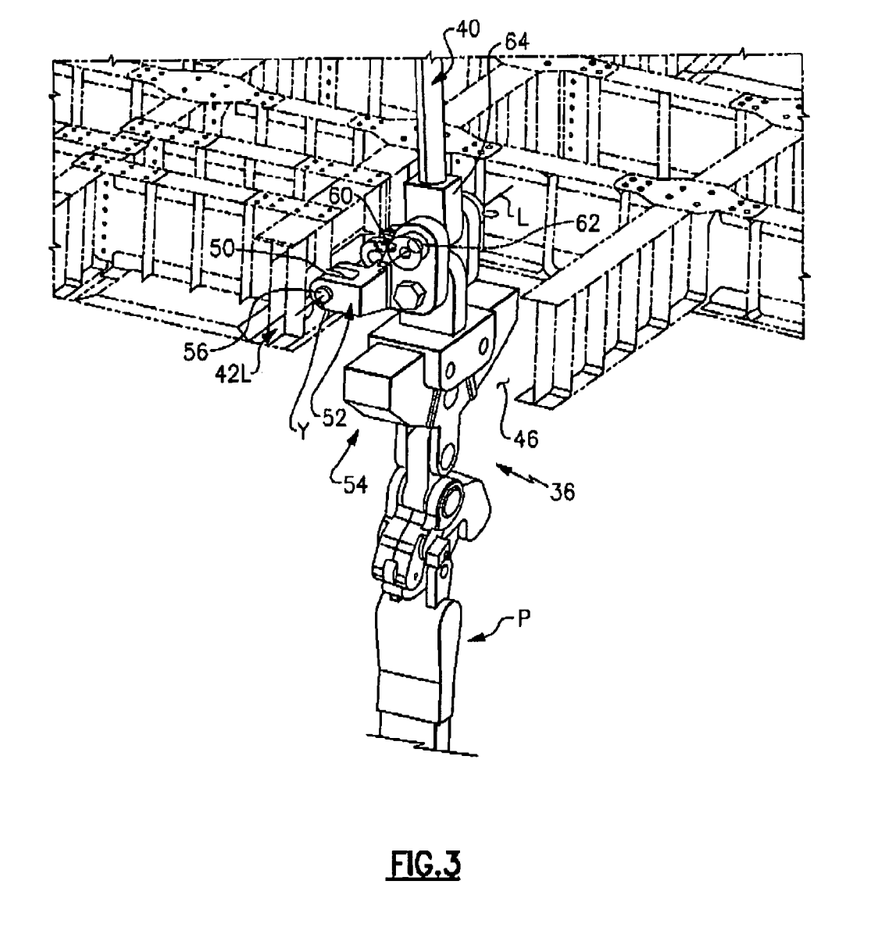
FIG. 3 is an expanded perspective view of a lower frame interface of the center hook system.

Referring to FIG. 3, the lower frame interface 36 generally includes a lug 50, an axial support swing arm 52, and a release system 54. The lug 50 is affixed to the frame 42 within the opening 46 to support the release system 54 on the axial support swing arm 52. The release system 54 may be of various forms such as an external cargo hook system, hoist system, or other engagement arrangement to engage a pendant P, set of slings, or other system.

Figure 4:
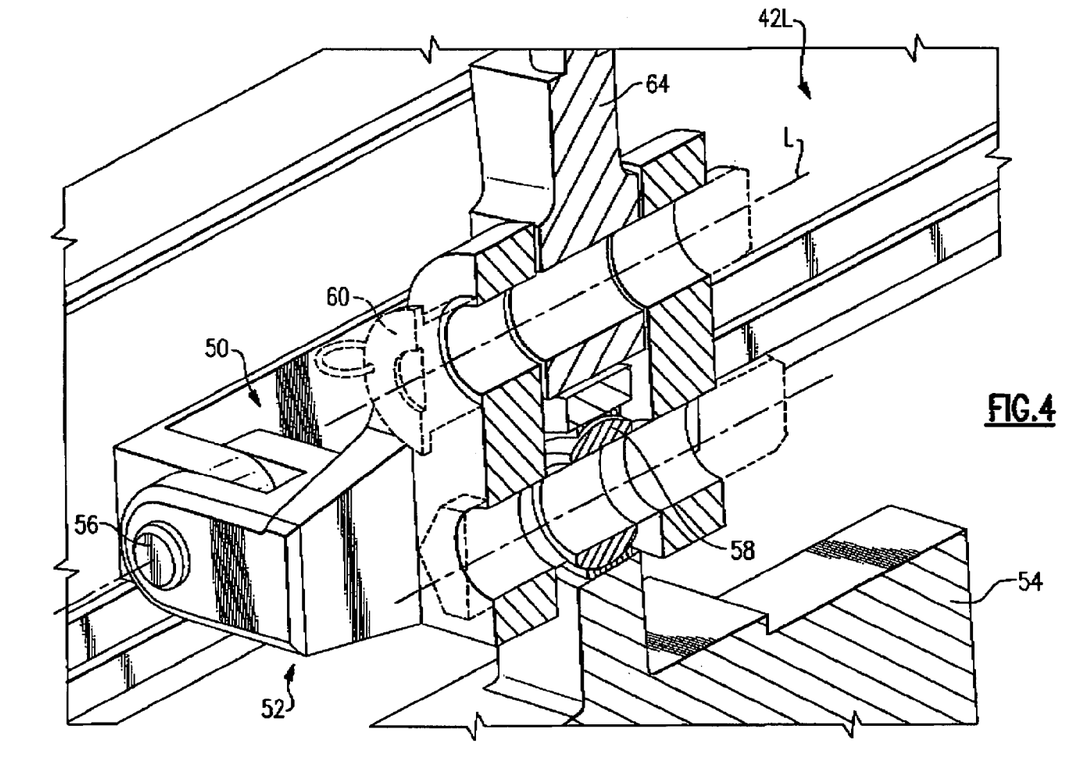
FIG. 4 is a sectional view of the lower frame interface.
Figure 5:
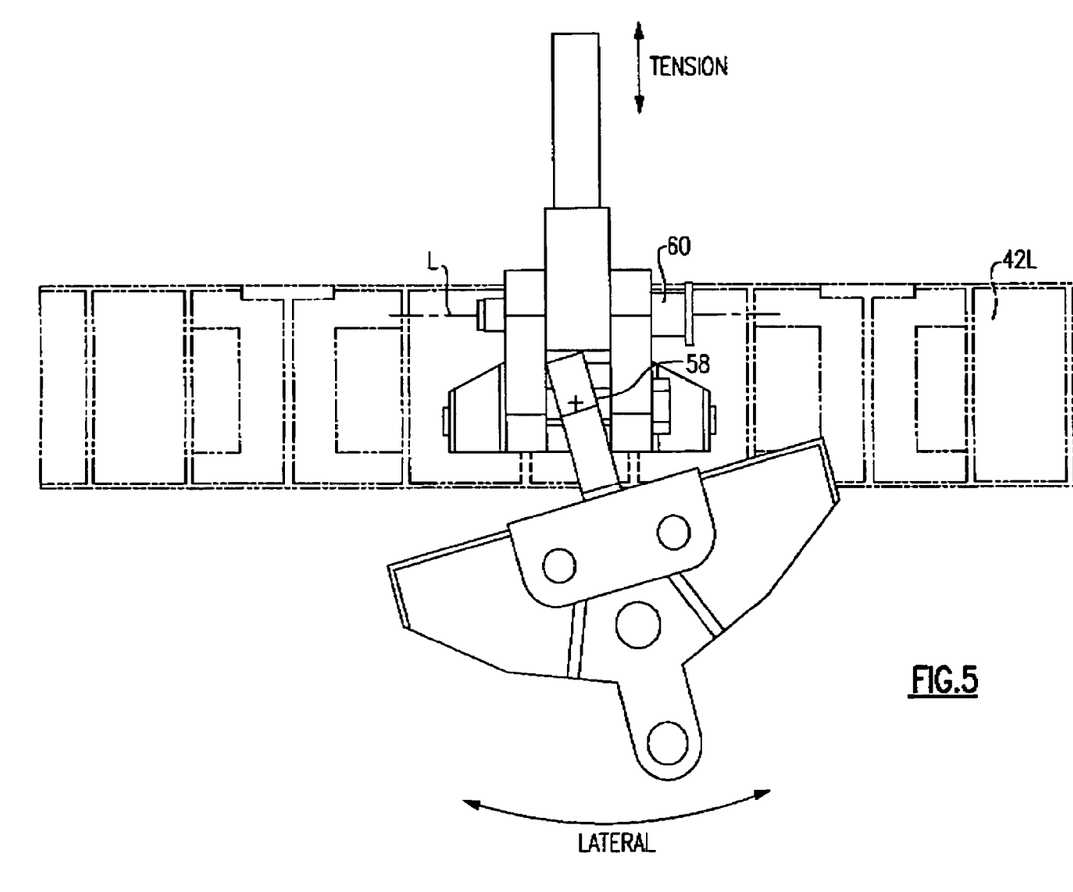
FIG. 5 is a front view of the lower frame interface illustrating an exemplary lateral deflection.
Figure 6:
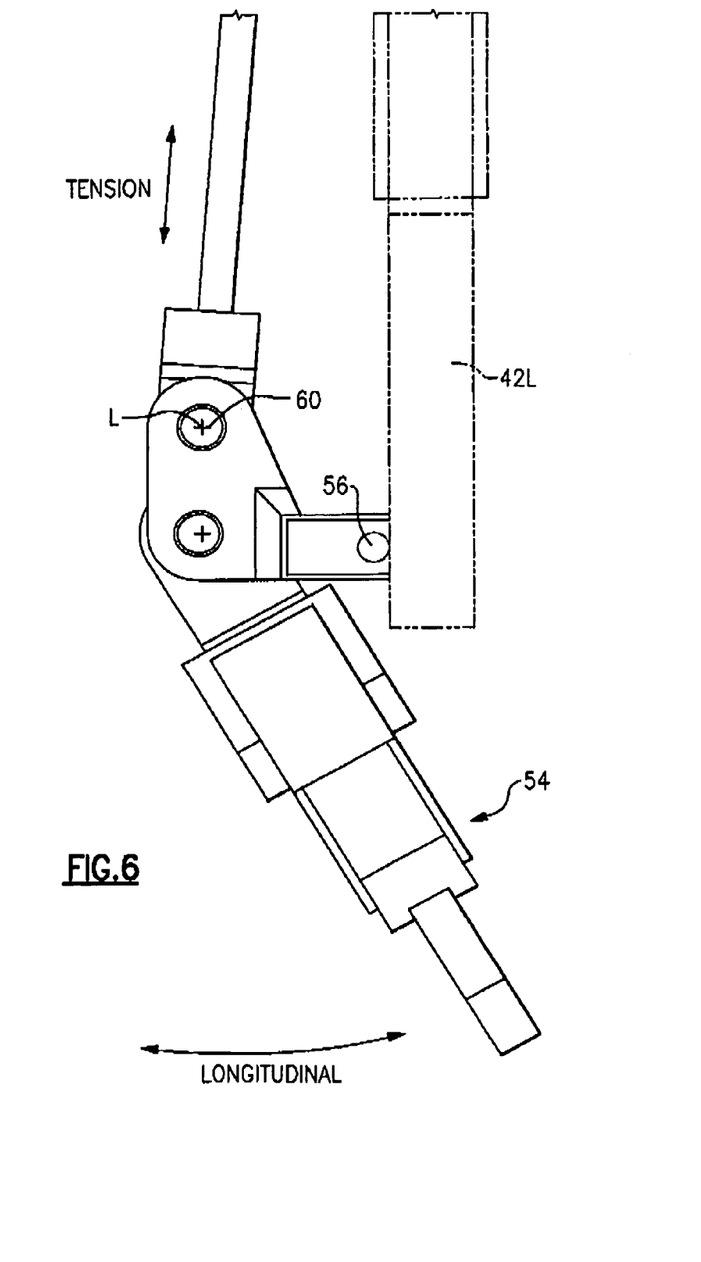
FIG. 6 is a side view of the lower frame interface illustrating an exemplary fore and aft deflection.

The axial support swing arm 52 is mounted to the lug 50 about an axis Y to permit fore and aft rotation about a pin 56. The axial support swing arm 52 interfaces with the lug 50 to react lateral loads. The axial support swing arm 52 includes a spherical joint 58 (FIG. 4) which accommodates lateral deflection (FIG. 5) as well as fore and aft deflection (FIG. 6) of the release system 54 to accommodate load angles between the slung load on the release system 54 and the aircraft axes in all directions.

The axial support swing arm 52 is removably mountable to the tension member 40 with a removable pin 60. The removable pin 60 passes through an aperture 62 defined along an axis L generally parallel to axis Y. The removable pin 60 engages a lower clevis 64 of the tension member 40. The tension member 40 interfaces with the axial support swing arm 52 at the removable pin 60 to transmit vertical loads therebetween.

Figure 7:
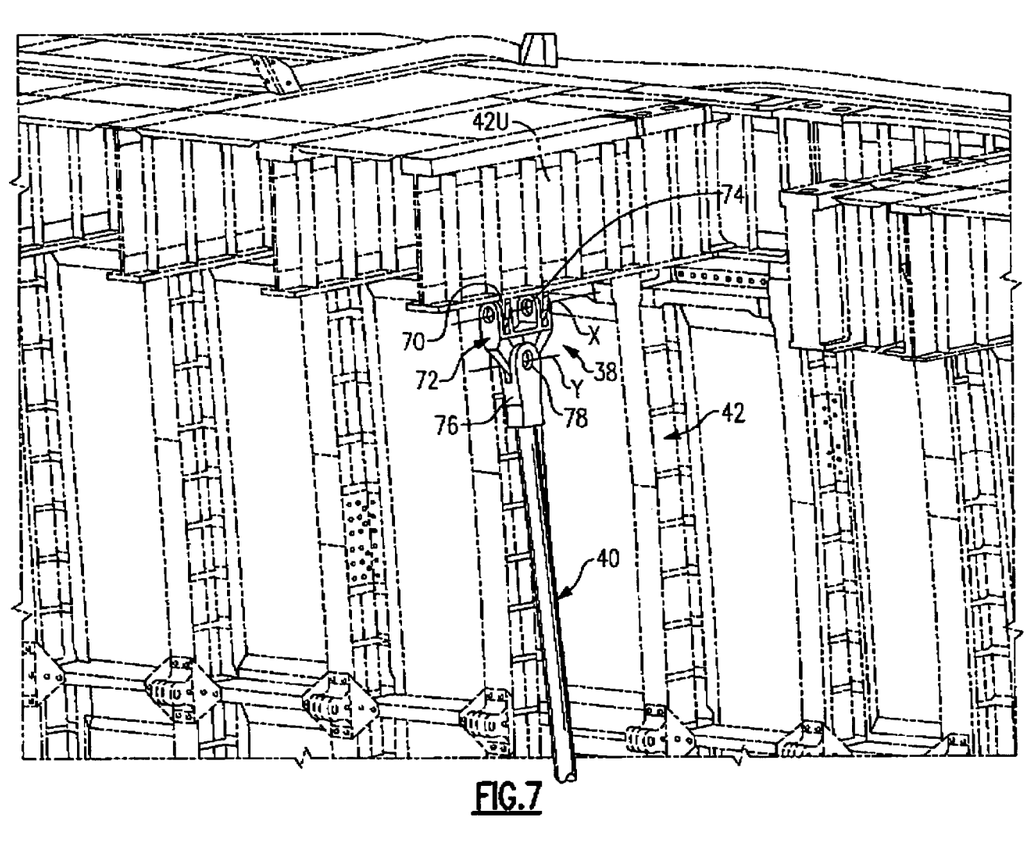
FIG. 7 is an expanded perspective view of an upper frame interface of the center hook system.

Referring to FIG. 7, the upper frame interface 38 generally includes a lug 70 fixed to the frame 42 and a swing arm 72. The swing arm 72 is mounted to the lug 70 about an axis x to permit fore and aft rotation about a lug pin 74. Although a particular arrangement is illustrated in the disclosed, non-limiting embodiment, it should be understood that other mount configurations and arrangements may alternatively or additionally be utilized herewith.

An upper clevis 76 of the tension member 40 is removably mountable to the swing arm 72 about an axis y to permit lateral rotation about a removable pin 78. Any force on the tension member 40 is thereby a tension load. That is, the tension member 40 operates only in tension between the lower frame interface 36 and upper frame interface 38.

In operation, the release system 54 accommodates lateral deflection as well as fore and aft deflection to direct tension loads through the tension member 40. The hinging effect of the axial support swing arm 52 also assures that the tension member 40 does not restrain normal flexing of the airframe 14 which may otherwise result in adverse load transfer to the tension member 40 due to flight loads.

During operations when the center hook system 32 is not required, removable pins 60 and 78 are removed and the tension member 40 is stowed to increase cabin occupiable space. The lower frame interface 36 may also be stowed within the opening 46 and covered by the floor panel 48P (FIG. 2A). To stow the lower frame interface 36, the tension member 40 is removed and the axial support swing arm 52 folds down about pin 56, release system 54 is then folded forward into opening 46. It should be understood that other stow arrangements may alternatively be provided.

The center hook system 32 facilitates structural weight savings, optimization of internal occupied space and improved reliability for structural performance due to straight forward load paths. The tension member 40 also minimizes airframe induced loading on the external cargo hook support structure.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present invention.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the invention may be practiced other than as specifically described. For that reason the appended claims should be studied to determine true scope and content.

What is claimed is:

1. An external hook system for a rotary-wing aircraft comprising:
a lower frame interface configured to accommodate longitudinal and lateral loads, said lower frame interface includes a lug fixed to a portion of an airframe frame and an axial support swing arm rotatably interlocked with said lug by a first pin, said axial support swing arm includes an aperture opposed from said lug and a spherical joint adjacent said aperture;
an upper frame interface; and a tension member mountable between said lower frame interface and said upper frame interface, said tension member operable to transfer tension loads between said lower frame interface and said upper frame interface, said tension member rotatably mountable to said lower frame interface by a second pin extending through said aperture.

2. The system as recited in claim 1, wherein said deflection includes longitudinal and lateral deflections about said spherical joint to react said longitudinal and lateral loads.

3. The system as recited in claim 1, wherein said upper frame interface includes a lug fixed to a portion of an airframe frame, said tension member mountable to said lug.

4. The system as recited in claim 1, wherein said upper frame interface includes a lug fixed to a portion of an airframe frame and a swing arm mounted to said lug about an axis to permit fore and aft rotation of said swing arm relative to said lug, said tension member mountable to said lug.

5. The system as recited in claim 1, wherein said upper frame interface is mounted proximate a main rotor system of the rotary-wing aircraft.

6. The system as recited in claim 1, wherein said upper frame interface is mounted below a main rotor gearbox of the rotary-wing aircraft.

7. The system as recited in claim 1, wherein said lower frame interface is proximate a cabin floor of the rotary-wing aircraft.

8. The system as recited in claim 1, wherein said first pin defines a first central axis and said second pin defines a second central axis that is parallel to said first central axis.

9. The system as recited in claim 1, wherein said lower frame interface is within an opening of the airframe frame.

10. The system as recited in claim 9, wherein said lug is fixed to an inner periphery of said opening.

11. The system as recited in claim 1, wherein aperture is above said spherical joint.

12. The system as recited in claim 1, further comprising a cargo release system mounted to said spherical joint, said cargo release system selected from the group consisting of a cargo hook system, a hoist system and combinations thereof.

13. A rotary-wing aircraft comprising:
an airframe;
a main rotor system supported by said airframe;
a lower frame interface mounted to a lower portion of said airframe, said lower frame interface configured to accommodate longitudinal loads and lateral loads, said lower frame interface includes a lug fixed to a portion of an airframe frame and an axial support swing arm rotatably interlocked with said lug by a first pin, said axial support swing arm includes an aperture opposed from said lug and a spherical joint adjacent said aperture;
an upper frame interface mounted to an upper portion of said airframe adjacent said main rotor system; and
a tension member removably mountable between said lower frame interface and said upper frame interface through an aircraft cabin defined by said airframe, said tension member operable to transfer tension loads between said lower frame interface and said upper frame interface, said tension member rotatably mountable to said lower frame interface by a second pin extending through said aperture.

14. The rotary-wing aircraft as recited in claim 13, wherein said lower portion of said airframe and said upper portion of said airframe is defined by a single frame.

15. The rotary-wing aircraft as recited in claim 13, wherein said upper frame interface is mounted directly below a main rotor gearbox of the rotary-wing aircraft.

16. The rotary-wing aircraft as recited in claim 13, wherein said lower frame interface is mounted to said lower portion of said first frame proximate a cabin floor of the rotary-wing aircraft.

\* \* \* \* \*

UNITED STATES PATENT AND TRADEMARK OFFICE
CERTIFICATE OF CORRECTION

PATENT NO. : 8,636,250 B2  
APPLICATION NO. : 13/258545  
DATED : January 28, 2014  
INVENTOR(S) : Toni et al.

It is certified that error appears in the above-identified patent and that said Letters Patent is hereby corrected as shown below:

IN THE CLAIMS:

Claim 2, column 5, line 8: delete "said"

Signed and Sealed this  
Twenty-ninth Day of April, 2014

Michelle K. Lee  
*Deputy Director of the United States Patent and Trademark Office*